United States Patent
Tsukagoshi et al.

(10) Patent No.: US 9,506,412 B2
(45) Date of Patent: Nov. 29, 2016

(54) CONTROL APPARATUS FOR INTERNAL COMBUSTION ENGINE

(75) Inventors: Takahiro Tsukagoshi, Susono (JP); Kouji Morita, Mishima (JP); Takahiko Fujiwara, Sunto-gun (JP); Kazuhisa Matsuda, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/355,045

(22) PCT Filed: Nov. 2, 2011

(86) PCT No.: PCT/JP2011/075317
§ 371 (c)(1),
(2), (4) Date: Apr. 29, 2014

(87) PCT Pub. No.: WO2013/065149
PCT Pub. Date: May 10, 2013

(65) Prior Publication Data
US 2014/0303875 A1   Oct. 9, 2014

(51) Int. Cl.
*F02D 41/00* (2006.01)
*F02D 41/12* (2006.01)
(Continued)

(52) U.S. Cl.
CPC .......... *F02D 41/003* (2013.01); *F02D 19/084* (2013.01); *F02D 41/0005* (2013.01); *F02D 41/123* (2013.01); *F02M 25/06* (2013.01);
(Continued)

(58) Field of Classification Search
CPC ....... Y02T 10/48; Y02T 10/18; Y02T 10/42; Y02T 10/36; Y02T 10/32; Y02T 10/44; F02N 11/0855; F02N 11/0814; F02D 17/02; F02D 41/0087; F02D 41/042; F02D 41/0002; F02D 41/0025; F02D 13/06

USPC ...... 701/103, 104, 112, 113; 123/481, 198 F, 123/198 DB, 491, 493, 179.4, 179.3, 575, 123/406.31, 402, 403
See application file for complete search history.

(56) References Cited

U.S. PATENT DOCUMENTS 5,390,640 A * 2/1995 Saito et al. ................... 123/491
8,401,764 B2 * 3/2013 Jentz et al. ................... 701/103
(Continued)

FOREIGN PATENT DOCUMENTS

EP    1586752 A1   10/2005
JP    2007-198196 A   8/2007
(Continued)

*Primary Examiner* — Stephen K Cronin
*Assistant Examiner* — Raza Najmuddin
(74) *Attorney, Agent, or Firm* — Andrews Kurth Kenyon LLP

(57) ABSTRACT

It is an object of this invention to restrain blow-by gas from reaching a catalyst during fuel cutoff, and protect the catalyst while coping with an increase in oil dilution amount resulting from the use of alcohol fuel, in an internal combustion engine that uses the alcohol fuel. An engine is equipped with a PCV mechanism that introduces blow-by gas in a crankcase into an intake system. Besides, when fuel cutoff is executed with the PCV mechanism in operation, an opening degree of a throttle valve during fuel cutoff is set on the basis of an oil dilution amount in lubricating oil. Thus, the throttle opening degree during fuel cutoff is adjusted in accordance with a generation amount of blow-by gas, so that an intake negative pressure can be appropriately reduced. Accordingly, during fuel cutoff, the amount of blow-by gas that is sucked out from the crankcase due to the intake negative pressure and introduced into the intake system can be held small.

2 Claims, 6 Drawing Sheets

(51) Int. Cl.
*F02D 19/08* (2006.01)
*F02M 25/06* (2016.01)
*F01M 13/00* (2006.01)

(52) U.S. Cl.
CPC ......... *F01M13/00* (2013.01); *F02D 2041/001* (2013.01); *F02D 2250/08* (2013.01); *F02D 2250/11* (2013.01); *Y02T 10/36* (2013.01); *Y02T 10/42* (2013.01)

(56) References Cited

U.S. PATENT DOCUMENTS

| | | | |
|---|---|---|---|
| 8,554,446 B2* | 10/2013 | Sano et al. | 701/104 |
| 8,746,211 B2* | 6/2014 | Aso et al. | 123/443 |
| 2009/0211545 A1* | 8/2009 | Satou | 123/41.86 |
| 2009/0235907 A1* | 9/2009 | Satou | 123/574 |
| 2009/0314260 A1* | 12/2009 | Maeda et al. | 123/491 |
| 2010/0031904 A1* | 2/2010 | Matsuura et al. | 123/41.86 |
| 2010/0192925 A1* | 8/2010 | Sadakane | 123/520 |
| 2011/0203552 A1* | 8/2011 | Aso et al. | 123/443 |
| 2011/0313642 A1* | 12/2011 | Sano et al. | 701/104 |
| 2013/0013171 A1* | 1/2013 | Ghafari et al. | 701/104 |
| 2013/0184969 A1* | 7/2013 | Rollinger et al. | 701/103 |
| 2013/0191008 A1* | 7/2013 | Surnilla et al. | 701/104 |

FOREIGN PATENT DOCUMENTS

| | | |
|---|---|---|
| JP | 2007-285239 A | 11/2007 |
| JP | 2009-138571 A | 6/2009 |
| JP | 2010-163895 | 7/2010 |
| JP | 2010-180774 A | 8/2010 |

* cited by examiner

INTAKE STROKE

INTAKE STROKE

CONTROL APPARATUS FOR INTERNAL COMBUSTION ENGINE

CROSS-REFERENCE TO RELATED APPLICATIONS

This is a national phase application based on the PCT International Patent Application No. PCT/JP2011/075317 filed on Nov. 2, 2011, the entire contents of which are incorporated herein by reference.

TECHNICAL FIELD

The invention relates to a control apparatus for an internal combustion engine, and more particularly, to a control apparatus for an internal combustion engine that is endowed with a function of introducing blow-by gas in a crankcase into an intake system.

BACKGROUND ART

In recent years, the number of vehicles that can use alcohol fuel, such as flexible fuel vehicles (FFV's), tends to increase. In an internal combustion engine that uses alcohol fuel, the amount of fuel injection is larger and the volatility of fuel is lower than in an internal combustion engine that uses gasoline. Therefore, injected fuel is likely to adhere to an intake passage or a wall surface in a cylinder, and as a result, the amount of fuel that is mixed with engine oil (an oil dilution amount) also tends to increase. Accordingly, in the case where alcohol fuel is used, it is preferable to employ a PCV mechanism or the like.

As disclosed in, for example, Patent Document 1 (Japanese Patent Application Publication No. 2009-138571 (JP-2009-138571 A)), the PCV mechanism introduces blow-by gas in a crankcase into an intake system, and the amount of blow-by gas introduced into the intake system is adjusted in accordance with an intake negative pressure. Thus, the fuel that has evaporated from engine oil can be burned together with the mixture.

Incidentally, the applicant recognizes documents cited below including the above-mentioned one as those associated with the invention.

RELATED ART DOCUMENTS

Patent Documents

Patent Document 1: Japanese Patent Application Publication No. 2009-138571 (JP-2009-138571 A)
Patent Document 2: Japanese Patent Application Publication No. 2007-198196 (JP-2007-198196 A)
Patent Document 3: Japanese Patent Application Publication No. 2007-285239 (JP-2007-285239 A)

SUMMARY OF THE INVENTION

Problem to Be Solved by the Invention

By the way, in the internal combustion engine of the conventional art, fuel cutoff is executed in a state where a throttle valve is throttled, for example, during deceleration. Thus, during fuel cutoff, the intake negative pressure increases, and the amount of blow-by gas introduced into the intake system also tends to increase. However, this blow-by gas flows out to an exhaust system without burning in the cylinder due to the execution of fuel cutoff, and reacts with oxygen on a catalyst. Thus, in the conventional art, the internal combustion engine that is mounted with the PCV mechanism so as to cope with the use of alcohol fuel has a problem in that a large amount of blow-by gas reacts with oxygen on the catalyst during fuel cutoff, and that the catalyst is likely to deteriorate due to reaction heat thereof.

The invention has been made to solve the aforementioned problem. It is an object of the invention to provide a control apparatus for an internal combustion engine that can restrain blow-by gas from reaching a catalyst during fuel cutoff and protect the catalyst while coping with an increase in oil dilution amount resulting from the use of alcohol fuel, in the internal combustion engine that uses the alcohol fuel.

Means for Solving the Problem

A first invention is characterized by being equipped with a throttle valve that is provided in an intake passage of an internal combustion engine to adjust an amount of intake air that is sucked into a cylinder via the intake passage;
a fuel injection valve that injects alcohol fuel into the intake passage and/or the cylinder;
a PCV mechanism that introduces, into the intake passage, evaporative fuel that has evaporated from lubricating oil in a crankcase of the internal combustion engine;
oil dilution amount estimation means for estimating an oil dilution amount as an amount of fuel that has been mixed with the lubricating oil in the crankcase; and
fuel cutoff throttle control means for setting an opening degree of the throttle valve during fuel cutoff on a basis of the oil dilution amount when fuel cutoff is executed with the PCV mechanism in operation.

According to a second invention, the fuel cutoff throttle control means is configured to increase the opening degree of the throttle valve during fuel cutoff as the oil dilution amount increases.

A third invention is equipped with a variable valve mechanism that can change valve-opening properties of an intake valve; and
fuel cutoff intake valve control means for retarding a valve-opening timing of the intake valve through a use of the variable valve mechanism as the oil dilution amount increases during fuel cutoff.

Effects of the Invention

According to the first invention, even in a situation where a large amount of blow-by gas is generated, in the case where fuel cutoff is executed, it is possible to increase the opening degree of the throttle valve on the basis of the oil dilution amount and restrain the intake negative pressure from rising. As a result, the amount of blow-by gas that is sucked out from the crankcase due to the intake negative pressure and introduced into an intake system can be held small. Then, the amount of blow-by gas that reaches the catalyst during fuel cutoff can be held small, and the occurrence of catalyst OT or the like can be prevented. Accordingly, good exhaust emission properties can be maintained, and abnormal exhaust noise or the like can be avoided.

According to the second invention, the amount of blow-by gas that is generated in the crankcase increases as the oil dilution amount increases. Thus, by increasing the opening degree of the throttle valve during fuel cutoff as the oil dilution amount increases, the intake negative pressure can be reduced in accordance with the amount of generation of blow-by gas, and a large amount of blow-by gas can be prevented from flowing into the intake system.

According to the third invention, the intake valve is closed in the initial stages of an intake stroke by retarding a valve-opening timing (IVO) of the intake valve, so that a negative pressure can be generated in the cylinder. Thus, even in a state where the throttle opening degree has been increased when fuel cutoff during deceleration is executed, a feeling of deceleration can be generated through the use of the negative pressure in the cylinder, and an improvement in driveability can be achieved.

MODE FOR CARRYING OUT THE INVENTION

First Embodiment
[Configuration of First Embodiment]

Figure 1:
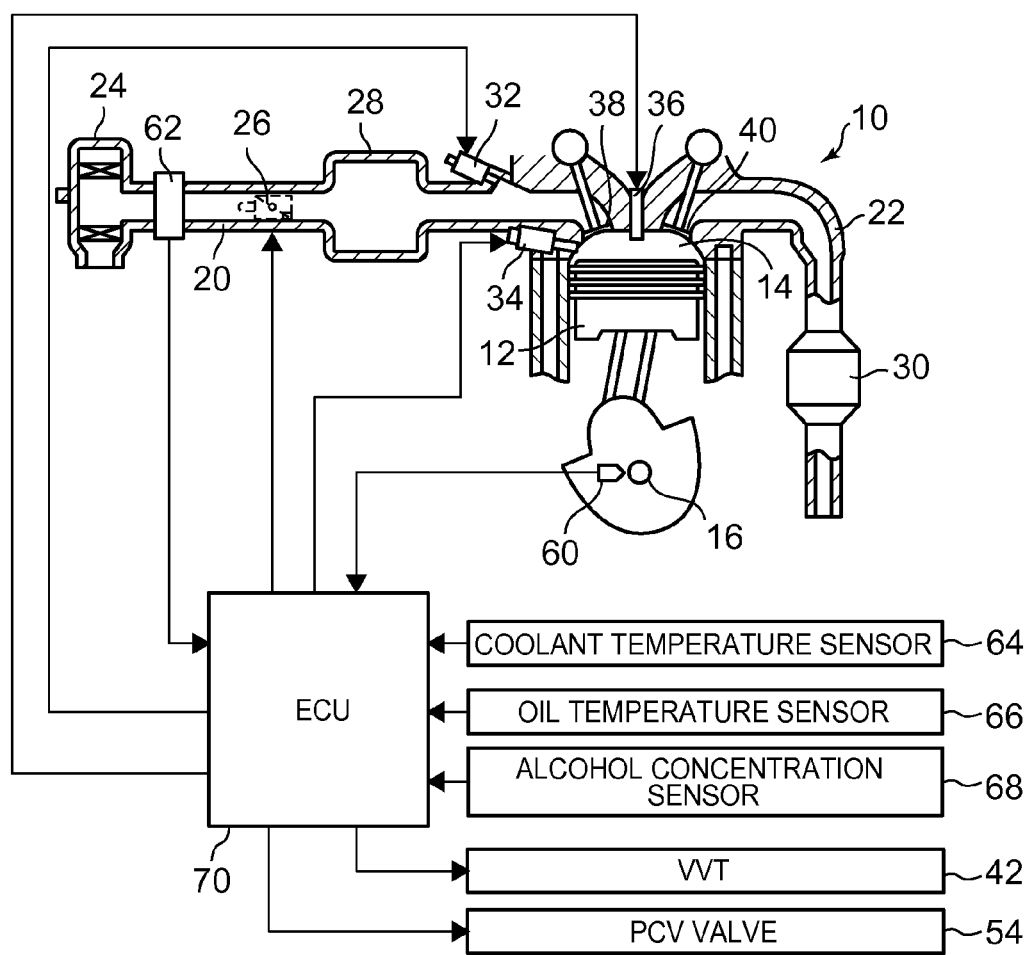
FIG. 1 is a configuration diagram for illustrating a system configuration of a first embodiment of the invention.

The first embodiment of the invention will be described hereinafter with reference to FIGS. 1 to 7. FIG. 1 is a configuration diagram for illustrating a system configuration of the first embodiment of the invention. Incidentally, in FIG. 1, the illustration of a PCV mechanism 50, which will be described later, is omitted. A system of this embodiment of the invention is equipped with an engine 10 as an internal combustion engine that is mounted on a vehicle such as a flexible fuel vehicle (an FFV) or the like. The engine 10 can use alcohol fuel containing, for example, methanol, ethanol, butanol and the like.

A combustion chamber 14 is formed by a piston 12 in each cylinder of the engine 10, and the piston 12 is coupled to a crankshaft 16. The crankshaft 16 is accommodated in a crankcase 18 (see FIG. 2) that is provided on a lower portion of an engine body. Besides, the engine 10 is equipped with an intake passage 20 through which intake air is sucked into each cylinder, and an exhaust passage 22 through which exhaust gas is discharged from each cylinder. The intake passage 20 is provided with an air cleaner 24, a throttle valve 26, and a surge tank 28, sequentially from an upstream side. The throttle valve 26 adjusts an amount of intake air that is sucked into the combustion chamber 14 (into the cylinder) via the intake passage 20, and is constituted by an electronically controlled butterfly valve or the like. The surge tank 28 constitutes part of the intake passage 20. On the other hand, the exhaust passage 22 is provided with a catalyst 30 such as a three-way catalyst or the like, which purifies exhaust gas.

Besides, each cylinder of the engine 10 is equipped with fuel injection valves 32 and 34 that inject fuel into the intake passage 20 (an intake port) and the cylinder respectively, an ignition plug 36 that ignites the mixture, an intake valve 38 that opens/closes the intake passage 20 to/from the interior of the cylinder, and an exhaust valve 40 that opens/closes the exhaust passage 22 to/from the interior of the cylinder. Incidentally, in the invention, the two fuel injection valves 32 and 34 are not absolutely required to be provided, and at least one of the fuel injection valves may be mounted. Besides, the engine 10 is equipped with a variable valve timing system (a VVT) 42 as a variable valve mechanism that can change valve-opening properties (a valve-opening timing and a valve-closing timing) of the intake valve 38.

The VVT 42 has a known configuration as disclosed in, for example, Japanese Patent Application Publication No. 2000-87769 (JP-2000-87769 A), and is equipped with an actuator that is interposed between a camshaft and a timing pulley. The camshaft rotates through the transmission of rotation of the crankshaft 16 via a timing chain and the timing pulley, and drives the intake valve 38 in an opening/closing manner. The VVT 42 causes the camshaft and the timing pulley to rotate relatively to each other with the aid of the actuator, and advances (makes earlier) and retards (makes later) a phase of the intake valve 38 in accordance with a relative rotational angle between the camshaft and the timing pulley. Incidentally, in the invention, it is also appropriate to adopt a configuration that employs a variable valve mechanism other than the VVT 42. More specifically, as indicated by, for example, Japanese Patent Application Publication No. 2007-132326 (JP-2007-132326 A), it is also appropriate to employ a variable valve mechanism that can change the valve-opening properties of the intake valve 38 by interposing a roller and a rocking arm between a rocker arm of the valve and the camshaft. Besides, it is also appropriate to employ an electromagnetically driven variable valve mechanism as indicated by Japanese Patent Application Publication No. 2007-16710 (JP-2007-16710 A). Furthermore, a mechanism (a VVL or the like) that changes the working angle of the intake valve 38 may be adopted as the variable valve mechanism.

Figure 2:
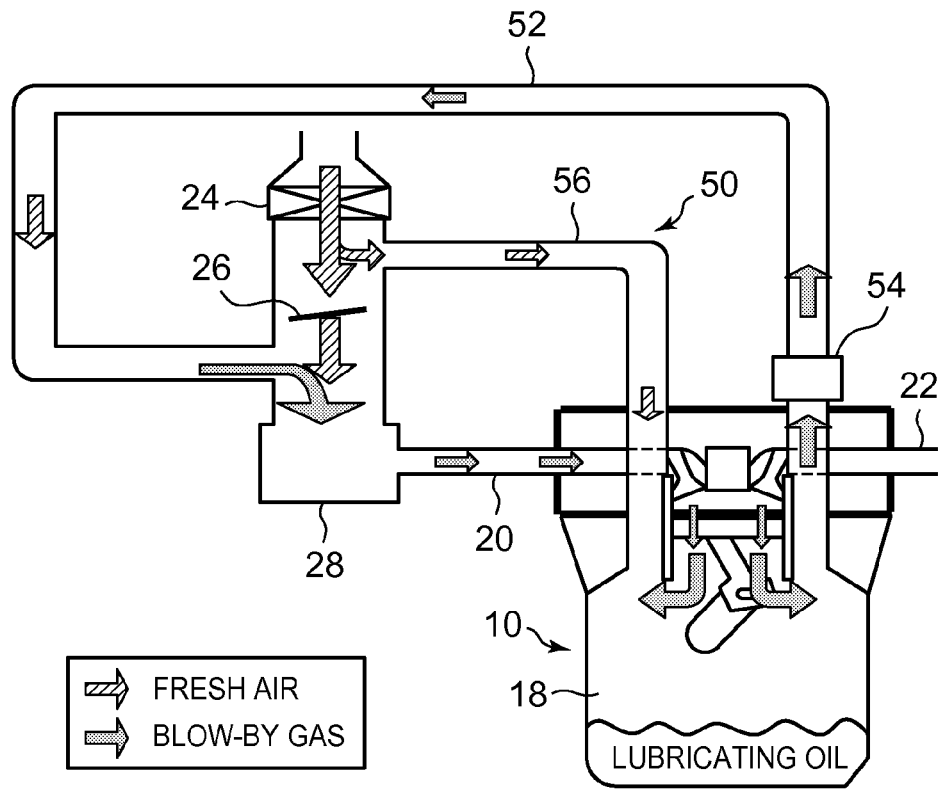
FIG. 2 is a configuration diagram showing a PCV mechanism.

Next, the positive crankcase ventilation (PCV) mechanism 50 that is mounted on the engine 10 will be described with reference to FIG. 2. FIG. 2 is a configuration diagram showing the PCV mechanism. The PCV mechanism 50 is equipped with a gas introduction passage 52, a PCV valve 54, and a fresh air introduction passage 56. The gas introduction passage 52 introduces gas (blow-by gas containing evaporative fuel that has evaporated from lubricating oil) in the crankcase 18 into the intake passage 20. The gas introduction passage 52 is connected on one end side thereof to a space in the crankcase 18, and is connected on the other end side thereof to the intake passage 20 downstream of the throttle valve 26.

Besides, the PCV valve 54 adjusts the amount of blow-by gas that is introduced from the crankcase 18 into the intake passage 20 via the gas introduction passage 52, and is constituted by a negative pressure-type flow rate control valve that opens/closes on the basis of an intake negative pressure, or the like. The fresh air introduction passage 56 introduces outside air (fresh air) into the crankcase 18 when blow-by gas flows out from the crankcase 18. The fresh air introduction passage 56 is connected on one end side thereof to the intake passage 20 upstream of the throttle valve 26, and is connected on the other end side thereof to the space in the crankcase 18.

Then, the PCV mechanism 50 operates during operation of the engine, and introduces gas in the crankcase 18 into the intake passage 20. Concretely, during operation of the engine, a negative pressure (an intake negative pressure) that is generated in the intake passage 20 is applied to the PCV valve 54, so that the PCV valve 54 opens. Thus, the intake negative pressure is applied to the gas introduction passage 52, and sucks gas in the crankcase 18 from the gas introduction passage 52 into the intake passage 20. Accordingly, due to operation of the PCV mechanism 50, gas such as evaporative fuel or the like that has accumulated in the crankcase 18 is scavenged, and this gas can be burned in the cylinder together with the mixture.

Next, a control system of the engine 10 will be described with reference to the foregoing FIG. 1. The system of this embodiment of the invention is equipped with a sensor system that includes sensors 60 to 68, and an engine control unit (an ECU) 70 that controls the operation state of the engine. First of all, the sensor system will be described. The crank angle sensor 60 outputs a signal that is synchronized with rotation of the crankshaft 16, and the air flow sensor 62 detects an intake air amount. Besides, the coolant temperature sensor 64 detects a temperature of engine coolant (an engine coolant temperature), the oil temperature sensor 66 detects a temperature of lubricating oil (a lubricating oil temperature), and the alcohol concentration sensor 68 detects a concentration of alcohol in fuel. It should be noted herein that each of the engine coolant temperature and the lubricating oil temperature is an example of an engine temperature that reflects the temperature of the engine. In addition, the sensor system includes various sensors (e.g., a throttle opening degree sensor that detects an opening degree of the throttle valve 26, an accelerator position sensor that detects an operation amount of an accelerator pedal, and the like) that are needed to control the engine. These sensors are connected to an input side of the ECU 70. On the other hand, the throttle valve 26, the fuel injection valves 32 and 34, the ignition plug 36, and actuators such as the VVT 42 and the like are connected to an output side of the ECU 70.

Then, the ECU 70 drives the respective actuators on the basis of operation information on the engine detected by the sensor system, and performs operation control. Concretely, the ECU 70 detects an engine rotational speed and a crank angle on the basis of an output of the crank angle sensor 60, and detects an intake air amount through the use of the air flow sensor 62. Besides, the ECU 70 calculates an engine load on the basis of the engine rotational speed and the intake air amount, calculates a fuel injection amount on the basis of the intake air amount, the engine load and the like, and determines a fuel injection timing and an ignition timing on the basis of the crank angle. At this time, the fuel injection amount is corrected on the basis of an engine coolant temperature, a concentration of alcohol in fuel, an operation amount of the accelerator pedal, and the like. Then, the ECU 70 drives the fuel injection valves 32 and 34 as soon as the fuel injection timing arrives, and drives the ignition plug 36 as soon as the ignition timing arrives. Thus, the mixture is burned in the combustion chamber 14 of each cylinder, so that the engine can be operated. Besides, the ECU 70 carries out various kinds of fuel cutoff including known fuel cutoff during deceleration. In fuel cutoff during deceleration, when the engine decelerates with the throttle valve 26 closed, fuel injection is stopped to make improvements in exhaust emission properties and fuel economy.

[Characteristics of First Embodiment]

Figure 3:
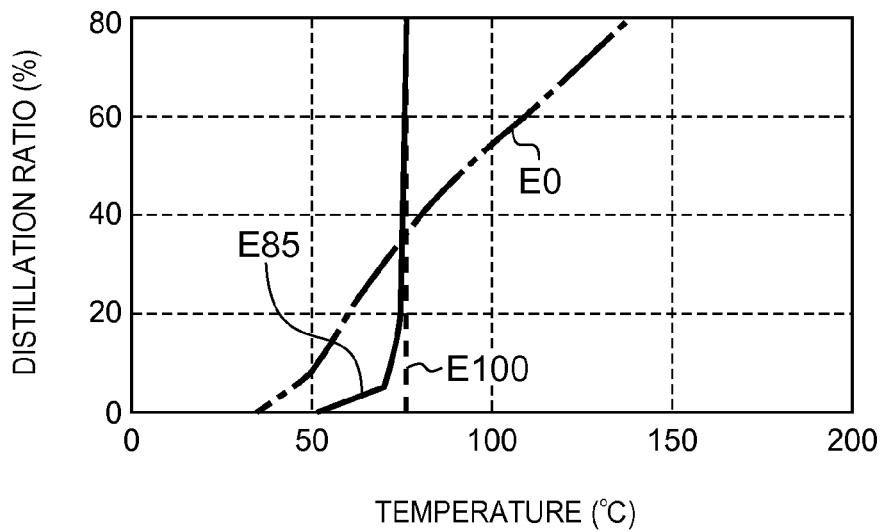
FIG. 3 is a characteristic diagram showing distillation properties of alcohol components in fuel.

In this embodiment of the invention, alcohol fuel is used as fuel of the engine 10. However, since alcohol components in fuel exhibit high hydrophilicity and high oleophilicity, they are likely to adhere to the intake port and a wall surface in the cylinder to be mixed with lubricating oil. That is, in the case where alcohol fuel is used, the amount of fuel that leaks out from the interior of the cylinder into the crankcase 18 to be mixed with lubricating oil (an oil dilution amount) tends to increase. In particular, in the case where the engine is operated in a low-temperature range equal to or lower than boiling points of alcohol components (during startup or the like) while the concentration of high-concentration alcohol is used, a gasification failure of fuel is caused, and the amount of fuel adherent to the wall surface or the oil dilution amount remarkably increases. It should be noted herein that FIG. 3 is a characteristic diagram showing distillation properties (changes in the ratio of distillation with respect to the temperature) of alcohol components in fuel. In this drawing, "E0", "E85", and "E100" exemplify cases where the concentration of alcohol (the concentration of ethanol) in fuel is 0%, 85%, and 100% respectively. As shown in FIG. 3, alcohol fuel has distillation properties that increase in uniformity as the concentration of alcohol in fuel rises, and is unlikely to gasify even at low temperatures.

On the other hand, if the process of warm-up of the engine proceeds and the temperature of lubricating oil reaches the vicinity of a boiling point of alcohol components, the fuel that has been mixed with lubricating oil has the properties of suddenly gasifying to become evaporative fuel. For this reason, in the case where the PCV mechanism 50 operates and fuel cutoff is executed with the catalyst 30 activated, the blow-by gas introduced into the intake system reaches the catalyst without burning in the cylinder, and reacts with oxygen on the catalyst. In this case, there occurs a phenomenon (catalyst OT) in which the temperature of the catalyst rises due to reaction heat and exceeds a heat resistance upper value, and a deterioration in the catalyst may be caused. Then, due to a deterioration in the function of the catalyst, a deterioration in the exhaust emission properties and abnormal exhaust noise are likely to be caused. In order to avoid these phenomena, a configuration that employs an electromagnetically driven PCV valve that is held closed during fuel cutoff to prevent blow-by gas from being supplied to the intake port is also conceivable. However, in the case where the electromagnetically driven PCV valve is adopted, an increase in the cost of the engine is incurred.

(FC Throttle Control)

Thus, in this embodiment of the invention, when fuel cutoff is executed with the PCV mechanism in operation, FC throttle control is performed to set an opening degree of the throttle valve 26 (a throttle opening degree) during fuel cutoff to a predetermined opening degree on the basis of an oil dilution amount (an integrated oil dilution amount). Incidentally, in the aforementioned control, a processing of estimating the oil dilution amount is performed according to a known method. More specifically, the ECU 70 leans in advance relationships between parameters, for example, a lubricating oil temperature, an engine load, a fuel injection amount and the like and an oil dilution amount, and calculates an oil dilution amount in each combustion cycle on the basis of this learned result. Then, by integrating this calculated value, the ECU 70 can estimate an oil dilution amount (an integrated oil dilution amount) at an arbitrary time point.

Besides, FC throttle control is performed if conditions (1) to (3) shown below are all fulfilled.

(1) The engine temperature is equal to or higher than a predetermined temperature. Concretely, an engine coolant temperature ethw is equal to or higher than a predetermined temperature T1, or a lubricating oil temperature etho is equal to or higher than a predetermined temperature T2.

(2) The integrated oil dilution amount effeldil is equal to or larger than a predetermined dilution amount criterial value.

(3) There is a request to execute fuel cutoff.

On the aforementioned condition (1), the predetermined temperatures T1 and T2 are each set as a temperature at which, for example, the evaporation amount of fuel that evaporates from lubricating oil suddenly increases (a temperature corresponding to the vicinity of boiling points of the aforementioned alcohol components). That is, in a state where the condition (1) is fulfilled, the amount of blow-by gas in the crankcase 18 increases and hence the PCV mechanism 50 needs to be continuously operated, but a relatively large amount of blow-by gas is introduced into the intake system if the PCV mechanism 50 is simply operated. Besides, on the aforementioned condition (2), the dilution amount criterial value is set as a minimum value of the integrated oil dilution amount effeldil that allows a large amount of blow-by gas to be generated, for example, when the condition (1) is fulfilled. That is, if the condition (2) is not fulfilled, the amount of fuel as a source of generation of blow-by gas in lubricating oil is not large, so that there is no need to perform FC throttle control. Furthermore, on the aforementioned condition (3), the request to execute fuel cutoff corresponds to a request to execute various kinds of fuel cutoff including fuel cutoff during deceleration, and a determination on the request is made on the basis of an operation state of the engine. If there is a request to execute fuel cutoff, fuel injection is stopped, and fuel cutoff is executed.

Figure 4:
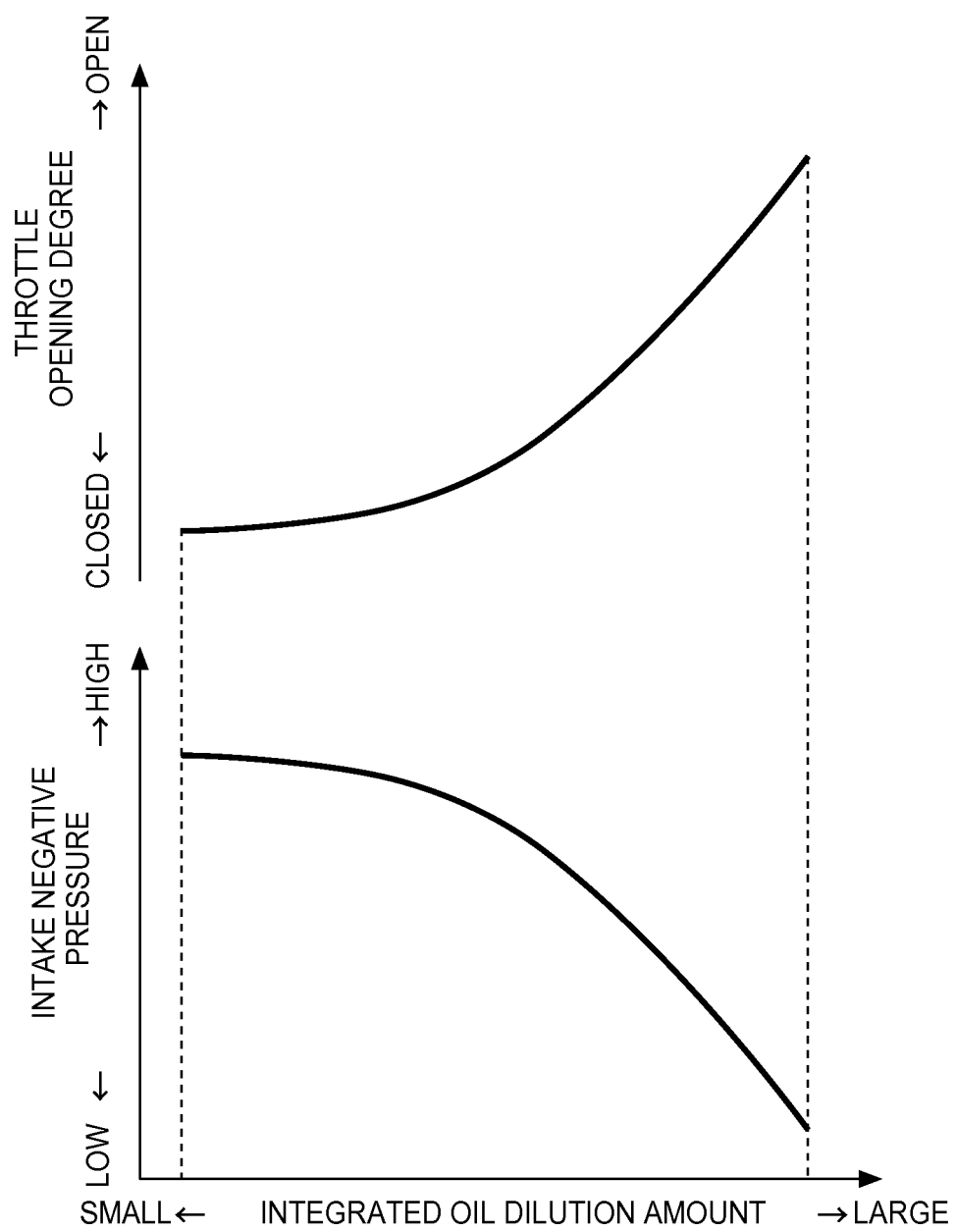
FIG. 4 is a characteristic diagram showing a relationship among an integrated oil dilution amount effeldil, a throttle opening degree, and an intake negative pressure in FC throttle control.

Next, a method of setting the throttle opening degree during fuel cutoff in FC throttle control will be described with reference to FIG. 4. FIG. 4 is a characteristic diagram showing a relationship among the integrated oil dilution amount effeldil, the throttle opening degree, and the intake negative pressure in FC throttle control. Incidentally, the relationship between the integrated oil dilution amount and the throttle opening degree, which is depicted in this drawing, is stored in advance in the ECU 70 as a data map or the like. In FC throttle control, as shown in FIG. 4, the throttle opening degree during fuel cutoff is increased as the integrated oil dilution amount effeldil increases. That is, on the premise that the temperature condition and the like are constant, the amount of blow-by gas generated in the crankcase 18 increases as the integrated oil dilution amount effeldil increases. Therefore, in FC throttle control, as the integrated oil dilution amount effeldil increases, the throttle opening degree during fuel cutoff is increased, and the intake negative pressure is reduced.

Thus, in a system that is equipped with the negative pressure-type PCV mechanism 50, even in the case where a large amount of blow-by gas is generated, the throttle opening degree during fuel cutoff is adjusted in accordance with the generation amount of blow-by gas, so that the intake negative pressure can be appropriately reduced. Then, the amount of blow-by gas that is sucked out from the crankcase 18 due to the intake negative pressure to be introduced into the intake system can be held small. As a result, even if the electromagnetically driven PCV valve is not adopted, the amount of blow-by gas reaching the catalyst 30 during fuel cutoff is held small, so that the occurrence of catalyst OT or the like can be prevented. Accordingly, it is possible to maintain good exhaust emission properties and avoid abnormal exhaust noise and the like, while restraining the cost of the PCV mechanism 50 from rising. Incidentally, it is also appropriate to adopt a configuration in which the throttle opening degree during fuel cutoff is changed in accordance with the engine coolant temperature and the lubricating oil temperature as well as the integrated oil dilution amount effeldil. That is, the generation amount of blow-by gas is considered to increase as these temperatures rise. Therefore, it is also appropriate to adopt a configuration in which the throttle opening degree during fuel cutoff is increased as the generated engine coolant temperature or the lubricating oil temperature rises.

(FC Intake Valve Control)

Figure 5:
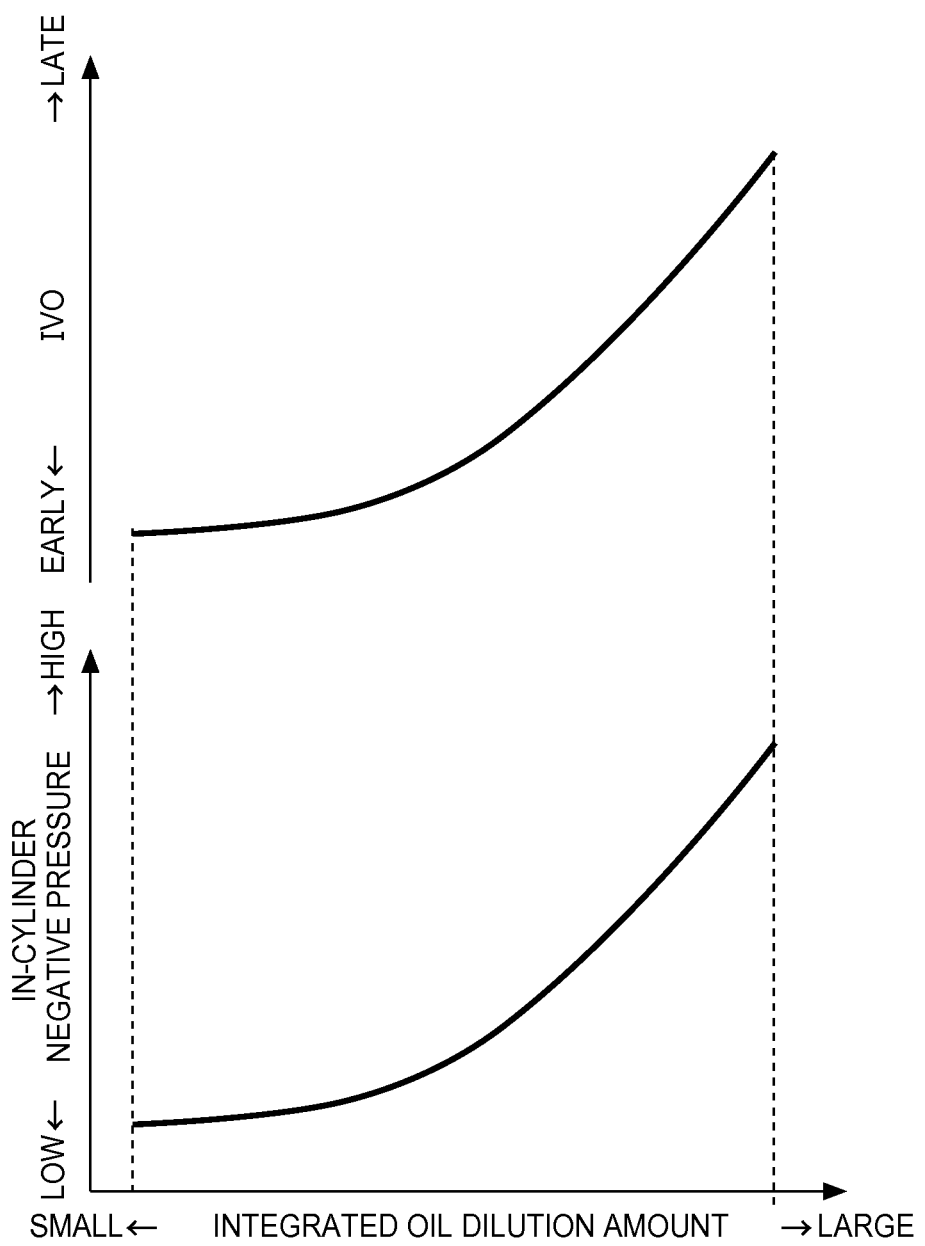
FIG. 5 is a characteristic diagram showing a concrete example of FC intake valve control.

According to FC throttle control, the operation and effect as described above are obtained. However, for example, while fuel cutoff during deceleration is executed, the pump loss decreases due to a fall in intake negative pressure, so that a driver may sense a fall in deceleration feeling (a fall in driveability). Thus, it is also appropriate to adopt a configuration in which FC intake valve control, which will be described later, is performed in conjunction with FC throttle control during the performance thereof. FIG. 5 is a characteristic diagram showing a concrete example of FC intake valve control.

Figure 6A:
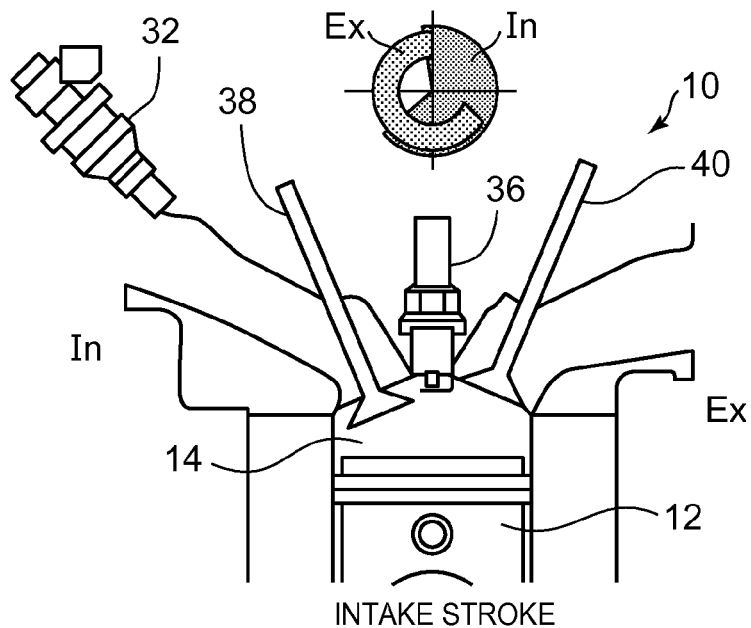
FIG. 6 is an illustration diagram showing a valve timing and the like of FC intake valve control.
Figure 6B:
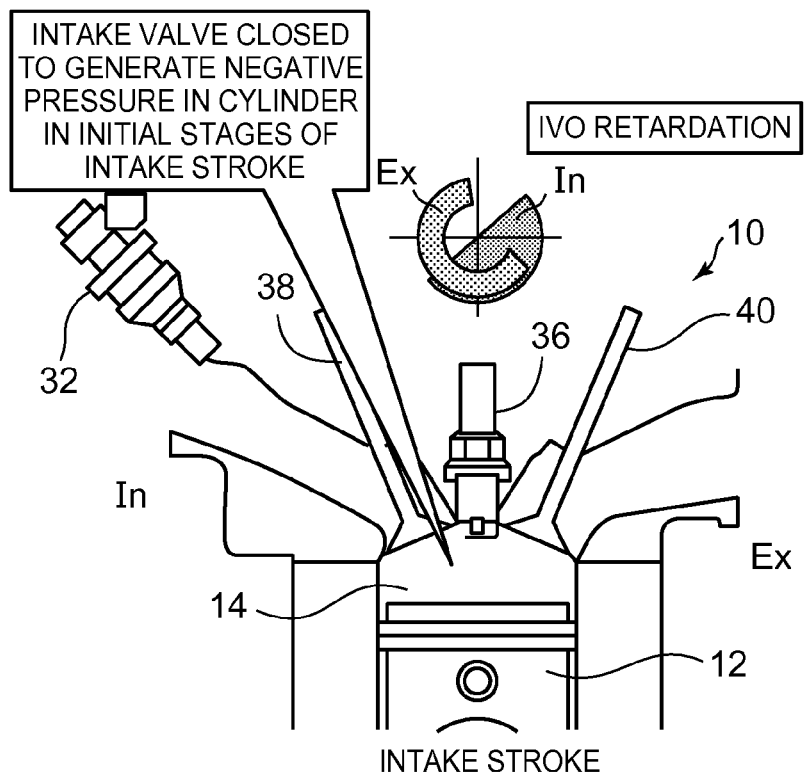

In FC intake valve control, as shown in FIG. 5, a valve-opening timing (IVO) of the intake valve 38 is retarded (made later) by the VVT 42 as the integrated oil dilution amount effeldil increases, during fuel cutoff. That is, this control means that the IVO is retarded as the throttle opening degree during fuel cutoff increases, namely, as the intake negative pressure falls. It should be noted herein that FIG. 6 is an illustration diagram showing a valve timing and the like of FC intake valve control. In this drawing, FIG. 6(*a*) shows a normal intake stroke at the time when FC intake valve control is not performed, and FIG. 6(*b*) shows an intake stroke in the case where FC intake valve control is performed.

In FC intake valve control, as shown in FIG. 6(*b*), the intake valve 38 is closed in the initial stages of an intake stroke by retarding the IVO, so that a negative pressure can be generated in the cylinder. Thus, when fuel cutoff during deceleration is executed, it is possible to create a feeling of deceleration through the use of a negative pressure in the cylinder and improve driveability, even in a state where the throttle opening degree has been increased. Incidentally, it is also appropriate to adopt a configuration in which the IVO during fuel cutoff is changed in accordance with the engine coolant temperature and the lubricating oil temperature as well as the integrated oil dilution amount effeldil. That is, it is also appropriate to adopt a configuration in which the IVO during fuel cutoff is retarded as the generated engine coolant temperature and the lubricating oil temperature rise in a manner corresponding to the throttle opening degree that increases as these temperatures rise.

[Concrete Processing for Realizing First Embodiment]

Figure 7:
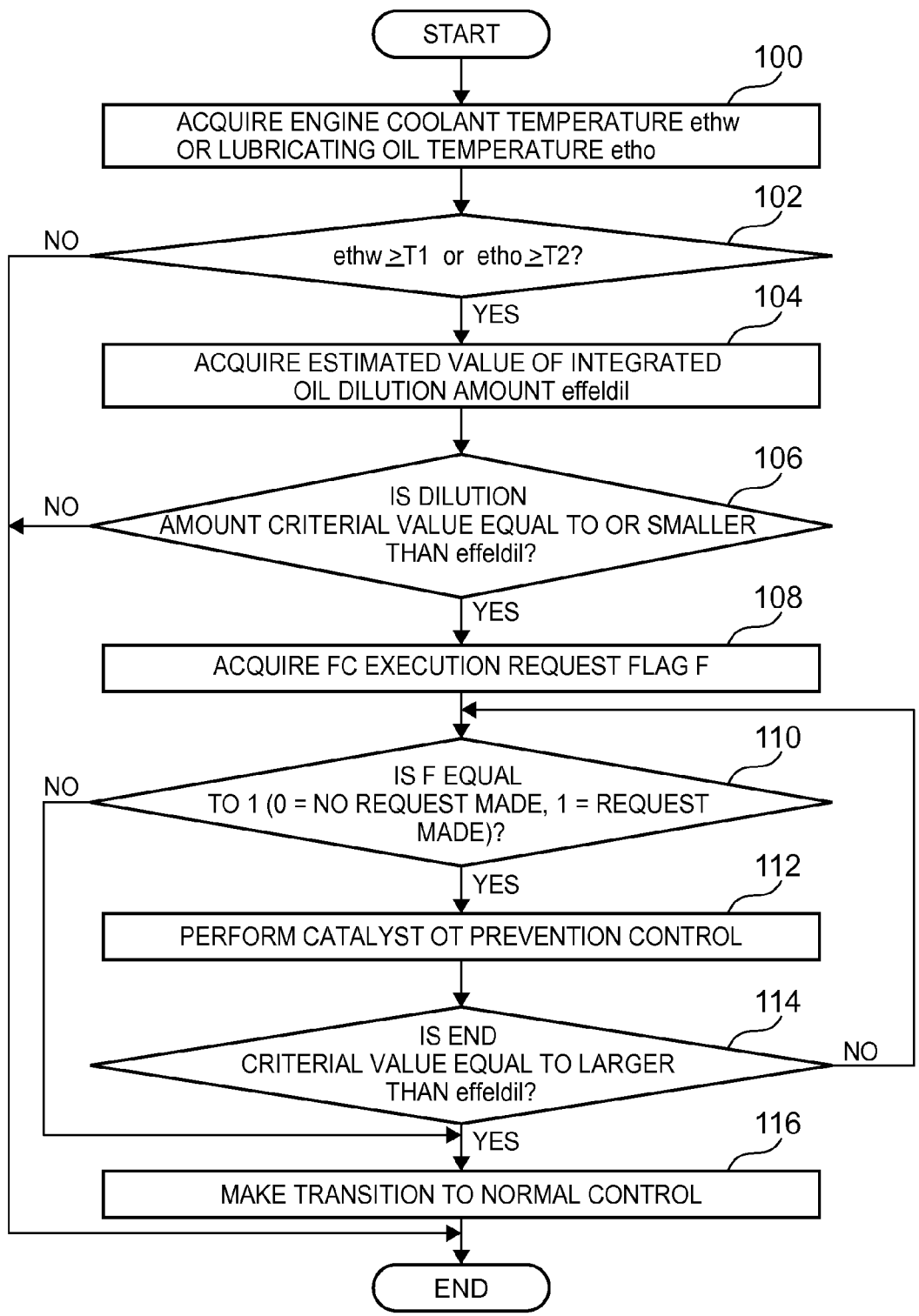
FIG. 7 is a flowchart showing control performed by an ECU in a first embodiment of the invention.

Next, a concrete processing for realizing the first embodiment of the invention will be described with reference to FIG. 7. FIG. 7 is a flowchart showing the control performed by the ECU in the first embodiment of the invention. A routine shown in this drawing is repeatedly executed during operation of the engine. In the routine shown in FIG. 7, first of all in step 100, an engine temperature (the engine coolant temperature ethw or the lubricating oil temperature etho) is acquired. In step 102, it is determined whether or not the engine temperature acquired in step 100 is equal to or higher than a predetermined temperature. That is, in step 102, it is determined whether or not the engine coolant temperature ethw is equal to or higher than the predetermined temperature T1 in the case where the engine coolant temperature ethw is used as the engine temperature, and it is determined whether or not the lubricating oil temperature etho is equal to or higher than the predetermined temperature T2 in the case where the lubricating oil temperature etho is used.

If the determination of step 102 is fulfilled, an estimated value of the integrated oil dilution amount effeldil estimated according to the foregoing known method is acquired in step 104. Then in step 106, it is determined whether or not the integrated oil dilution amount effeldil is equal to or larger than a predetermined dilution amount criterial value. It should be noted herein that if the determination is not fulfilled in one of steps 102 and 104, there is no need to perform FC throttle control, so that the control is immediately ended. On the other hand, if the determinations are fulfilled in both steps 102 and 104, an FC execution request flag F that reflects the presence or absence of a request to execute fuel cutoff is acquired in step 108. It should be noted herein that the FC execution request flag F is set to "1" if there is a request to execute fuel cutoff, and is set to "0" if there is no request to execute fuel cutoff, and that the FC execution request flag F is set on the basis of an operation state of the engine or the like through another routine (not shown).

Subsequently in step 110, it is determined whether or not the FC execution request flag F is "1". If this determination is fulfilled, catalyst OT prevention control is performed in step 112. It should be noted herein that catalyst OT prevention control represents the foregoing FC throttle control or the control as a combination of the foregoing FC intake valve control with this FC throttle control. On the other hand, if the determination of step 110 is not fulfilled, there is no need to perform catalyst OT prevention control. Therefore, a transition to step 116 is made to perform normal control (conventional control) without performing catalyst OT prevention control.

Subsequently in step 114, an acquired value of the integrated oil dilution amount effeldil is updated, and it is determined whether or not this value is equal to or smaller than an end criterial value. The end criterial value corresponds to a small value of the integrated oil dilution amount that has decreased to such an extent that there is no need to continue catalyst OT prevention control any longer. If the determination of step 114 is fulfilled, the oil dilution amount has sufficiently decreased. It is therefore determined that there is no need to continue catalyst OT prevention control, and catalyst OT prevention control is stopped to make a transition to step 116. Besides, if the determination of step 114 is not fulfilled, the oil dilution amount has not sufficiently decreased. Therefore, a return to step 110 is made, and catalyst OT prevention control is continued until the determination of step 114 is fulfilled.

Incidentally, in the foregoing first embodiment of the invention, step 104 in FIG. 7 represents a concrete example of oil dilution amount estimation means in claim 1, and step 112 in FIG. 7 represents a concrete example of fuel cutoff throttle control means and fuel cutoff intake valve control means in claims 1 through 3.

Besides, in the foregoing first embodiment of the invention, there is adopted a configuration in which the throttle opening degree during fuel cutoff is increased as the integrated oil dilution amount effeldil increases in FC throttle control. However, the invention requires nothing more than setting the throttle opening degree during fuel cutoff on the basis of the oil dilution amount, and it is not indispensable to increase the throttle opening degree during fuel cutoff in accordance with the oil dilution amount. That is, in the invention, it is also appropriate to hold the throttle opening degree during fuel cutoff constant as the oil dilution amount changes, for example, in part of a control range. Besides, if necessary, it is also appropriate to adopt a configuration in which the throttle opening degree during fuel cutoff is increased as the oil dilution amount decreases.

Besides, in the foregoing first embodiment of the invention, the case where the concentration of alcohol in fuel is detected by the alcohol concentration sensor 68 has been exemplified. However, the invention is not limited to this case. It is also appropriate to adopt a configuration in which the concentration of alcohol in fuel is estimated on the basis of an output of an exhaust gas sensor (an air-fuel ratio sensor) that detects an exhaust gas air-fuel ratio.

DESCRIPTION OF REFERENCE NUMERALS

10 ENGINE (INTERNAL COMBUSTION ENGINE)
12 PISTON
14 COMBUSTION CHAMBER
16 CRANKSHAFT
18 CRANKCASE
20 INTAKE PASSAGE
22 EXHAUST PASSAGE
24 AIR CLEANER
26 THROTTLE VALVE
28 SURGE TANK
30 CATALYST
32, 34 FUEL INJECTION VALVE
36 IGNITION PLUG
38 INTAKE VALVE
40 EXHAUST VALVE
42 VARIABLE VALVE MECHANISM (VVT)
50 PCV MECHANISM
52 GAS INTRODUCTION PASSAGE
54 PCV VALVE
56 FRESH AIR INTRODUCTION PASSAGE
60 CRANK ANGLE SENSOR
62 AIR FLOW SENSOR
64 COOLANT TEMPERATURE SENSOR
66 OIL TEMPERATURE SENSOR
68 ALCOHOL CONCENTRATION SENSOR
70 ECU

The invention claimed is:

1. A control apparatus for an internal combustion engine, characterized by comprising:
    a throttle valve that is provided in an intake passage of the internal combustion engine to adjust an amount of intake air that is sucked into a cylinder via the intake passage;
    a fuel injection valve that injects alcohol fuel into the intake passage and/or the cylinder;
    a PCV mechanism that introduces, into the intake passage, evaporative fuel that has evaporated from lubricating oil in a crankcase of the internal combustion engine;
    an oil dilution amount estimation unit configured to estimate an oil dilution amount as an amount of fuel that has been mixed with the lubricating oil in the crankcase; and
    a fuel cutoff throttle control unit configured to set an opening degree of the throttle valve during fuel cutoff on a basis of the oil dilution amount when fuel cutoff is executed with the PCV mechanism in operation, wherein
    the fuel cutoff throttle control unit is configured to increase the opening degree of the throttle valve during fuel cutoff as the oil dilution amount increases.

2. The control apparatus for the internal combustion engine according to claim 1, further comprising:

a variable valve mechanism that can change valve-opening properties of an intake valve; and a fuel cutoff intake valve control unit configured to retard a valve-opening timing of the intake valve through a use of the variable valve mechanism as the oil dilution amount increases during fuel cutoff.

\* \* \* \* \*